(12) United States Patent
D'Souza et al.

(10) Patent No.: US 8,750,093 B2
(45) Date of Patent: Jun. 10, 2014

(54) METHOD AND APPARATUS OF IMPLEMENTING AN INTERNET PROTOCOL SIGNALING CONCENTRATOR

(75) Inventors: Maurice Gerard D'Souza, Plano, TX (US); Hyunyung Cha, Plano, TX (US); Marc Sissom, Allen, TX (US); Ying Li, Dallas, TX (US)

(73) Assignee: Ubeeairwalk, Inc. (TW)

( * ) Notice: Subject to any disclaimer, the term of this patent is extended or adjusted under 35 U.S.C. 154(b) by 240 days.

(21) Appl. No.: 13/012,976

(22) Filed: Jan. 25, 2011

(65) Prior Publication Data

US 2012/0044799 A1 Feb. 23, 2012

Related U.S. Application Data

(60) Provisional application No. 61/374,471, filed on Aug. 17, 2010.

(51) Int. Cl.
*H04J 1/16* (2006.01)
*H04W 4/00* (2009.01)

(52) U.S. Cl.
USPC .......................... 370/218; 370/220; 370/328

(58) Field of Classification Search
USPC .......................................... 370/218, 220, 328
See application file for complete search history.

(56) References Cited

U.S. PATENT DOCUMENTS

| | | | |
|---|---|---|---|
| 2002/0021661 A1* | 2/2002 | DeGrandpre et al. | 370/219 |
| 2004/0252645 A1* | 12/2004 | Gross et al. | 370/242 |
| 2007/0165612 A1* | 7/2007 | Buckley | 370/356 |
| 2008/0014961 A1* | 1/2008 | Lipps et al. | 455/456.1 |
| 2008/0285438 A1* | 11/2008 | Marathe et al. | 370/220 |
| 2009/0285574 A1* | 11/2009 | Liu | 398/2 |
| 2012/0106318 A1* | 5/2012 | Gu et al. | 370/216 |

* cited by examiner

*Primary Examiner* — Andrew Lee

(57) ABSTRACT

Communication between base station controllers and a mobile switching center may be provided by a consolidating device that operates between the BSCs and the MSCs. One example method of operation may include initiating an active process on an active network device and a standby process on a redundant network device configured as a backup to the active network device. Other operations may include receiving a data message from at least one base station controller on the active network device, and detecting a communication failure by at least one of the active process and the standby process, in response to the received data message. Other operations may include automatically configuring the redundant network device to become the active network device.

20 Claims, 14 Drawing Sheets

METHOD AND APPARATUS OF IMPLEMENTING AN INTERNET PROTOCOL SIGNALING CONCENTRATOR

CROSS REFERENCE TO RELATED APPLICATIONS

This application claims benefit to provisional application 61/374,471, entitled "IPSO Internet Protocol Signaling Concentrator", filed on Aug. 17, 2010, the entire contents of which are hereby incorporated by reference.

TECHNICAL FIELD OF THE INVENTION

This invention relates to a method and apparatus of concentrating communications between base station controllers and mobile switching centers, and, more specifically, to providing optimum communication signaling and compatibility for increased communication demands in cellular communication networks.

BACKGROUND OF THE INVENTION

Communication network systems are continuously facing constraints in the amount of time, bandwidth, efficiency and other similar factors that must be considered for the network to operate as desired. Mobile communication systems are no exception to the common constraints experienced by data networks.

A mobile communication system may include mobile stations (MSs), base stations (BSs), base station controllers (BSC), base station managers (BSMs), mobile switching centers (MSCs) and other hardware devices that are required to provide voice, data and other services to the subscribers of such services. In addition to the various communication devices, common protocols and standards, such as, file transfer protocol (FTP), Internet protocol (IP), various operating systems (OSs), stream control transmission protocol (SCTP), simple network management protocol (SNMP) may also be required to operate the communication services offered by the network.

The conventional communication infrastructure of providing one MSC to a plurality of BSCs is illustrated in the prior art diagram of FIG. 1. Referring to FIG. 1, a single platform MSC 104 provides communication services to multiple BSCs 101-103. However, as a single physical and/or virtual device, the MSC 104 may experience challenges in accommodating the needs of multiple BSCs 101-103, especially in growing communication networks where more BSCs will likely be added limiting the already limited amount of resources available to the MSC 104. Limited resources, such as, bandwidth, port availability, and other constraints currently offered by conventional communication network infrastructures could limit the growth and success of such communication networks.

SUMMARY OF THE INVENTION

One example embodiment of the present invention may include a method of communicating between a plurality of base station controllers and at least one mobile switching center. The method may include initiating an active process on an active network device and a standby process on a redundant network device configured as a backup to the active network device, receiving a data message from at least one of the plurality of base station controllers on the active network device, detecting a communication failure by at least one of the active process and the standby process, in response to the received data message, and automatically configuring the redundant network device to become the active network device.

Another example embodiment of the present invention may include an apparatus configured to communicate between a plurality of base station controllers and at least one mobile switching center. The apparatus may include a processor configured to initiate an active process on the apparatus and a standby process on a redundant network device configured as a backup to the apparatus. The apparatus may also include a receiver configured to receive a data message from at least one of the plurality of base station controllers. The processor may be further configured to detect a communication failure by at least one of the active process and the standby process, in response to the received data message, and automatically configure the redundant network device to become an active network device.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments described in this disclosure may be applied to an Internet Protocol (IP) concentrator and/or IP concentrator application as it relates to a unique IP-based communication network. Examples of such networks, which may incorporate the IP concentrator may include a code division multiple access (CDMA) radio access network (RAN) type of communication network or a similar communication network infrastructure.

Figure 1:
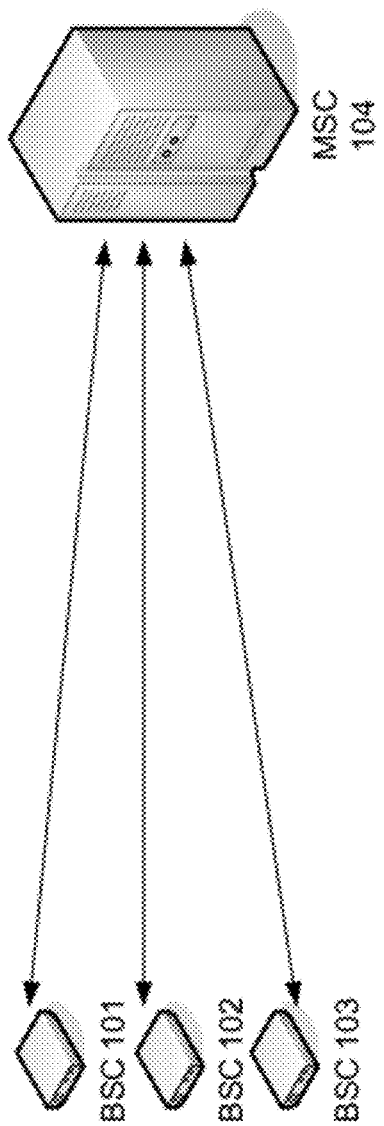
FIG. 1 illustrates a conventional network configuration.
Figure 2:
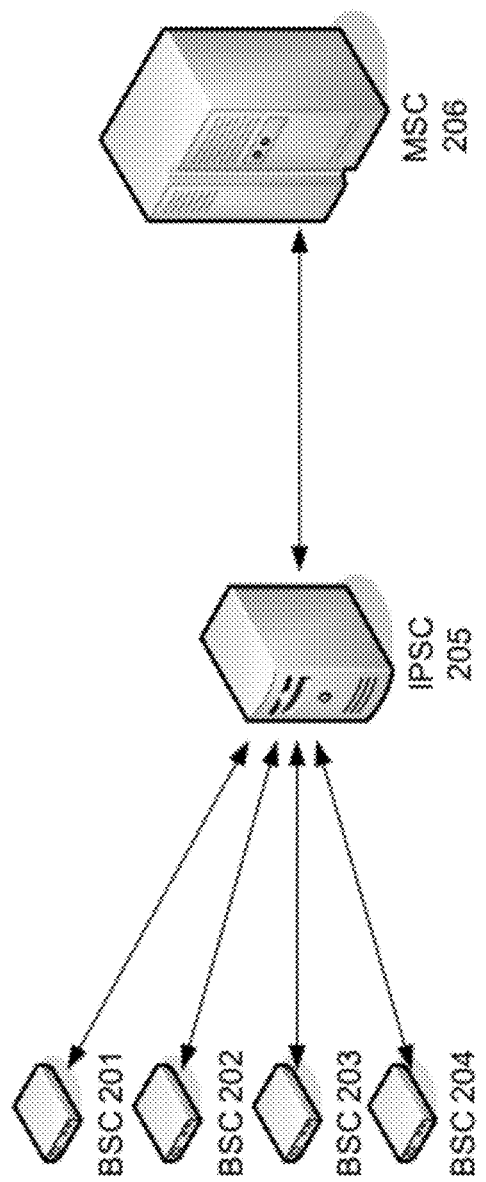
FIG. 2 illustrates an example network configuration of implementing an IPSC, according to example embodiments of the present invention.

FIG. 2 illustrates an example diagram of an IPSC operating in a mobile communication network, according to example embodiments of the present invention. Referring to FIG. 2, a MSC 206 communicates with an IPSC 205, which, in turn, communicates with a plurality of BSCs 201-204.

The base station controller (BSC) may provide access to multiple base stations (BS), which, in turn provide communication services to multiple mobile stations (MS). The BSC handles allocation of radio channels, receives measurements from the MSs, and controls handovers from BS to BS. The BSC may act as a concentrator for multiple connections to BSs. This concentration effort may consolidate many smaller connections in between the mobile switching center (MSC). Such a network configuration may provide networks that are often structured to have many BSCs distributed into regions near their BSs, which are then connected to large centralized MSC sites.

Figure 3:
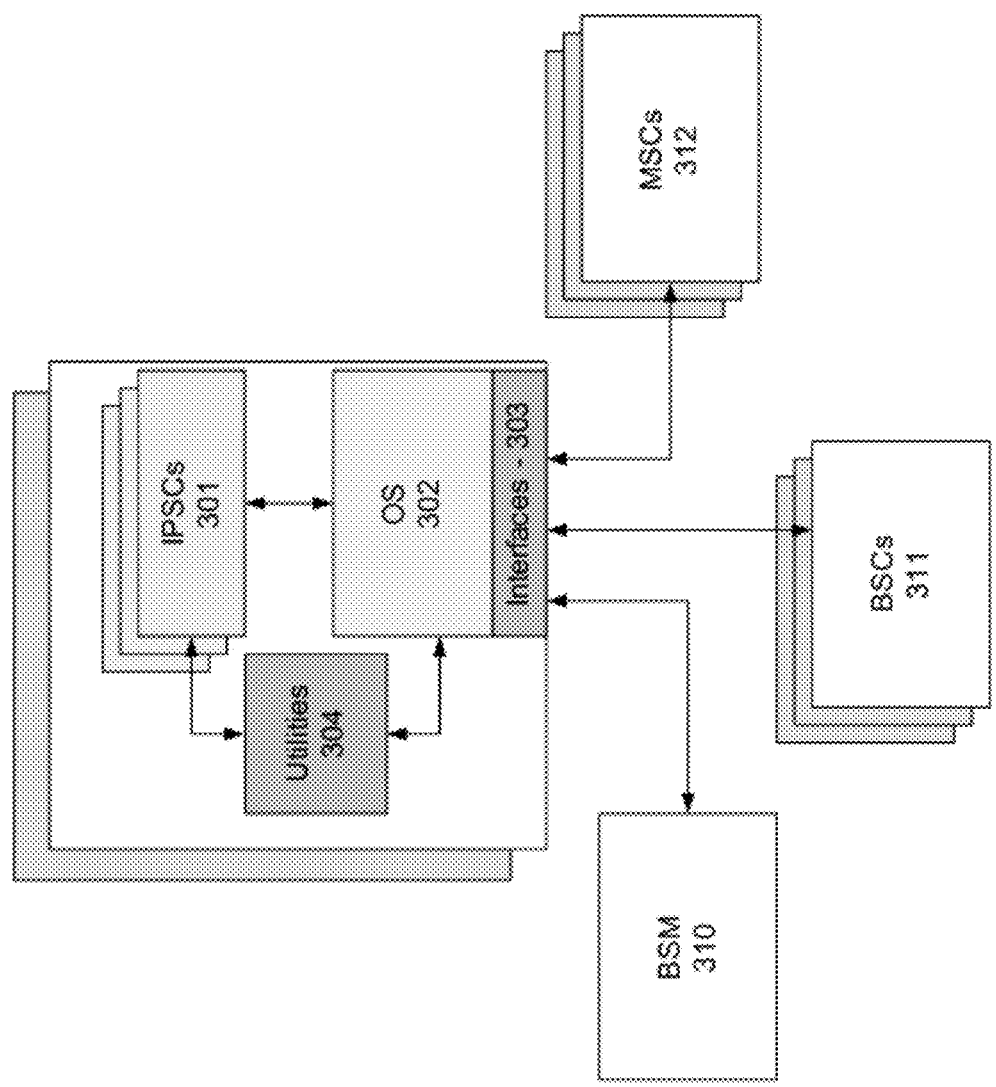
FIG. 3 illustrates an example system diagram, according to example embodiments of the present invention.

FIG. 3 illustrates an example system overview, according to example embodiments of the present invention. Referring to FIG. 3, a plurality of IPSCs are denoted 301 as a platform pair, which communicate with an OS 302 and various utilities or tools 304, such as, SNMP, FTP, etc. Interfaces 303 provide access to bidirectional communication between the IPSCs 301 and base station managers (BSM) 310, base station controllers (BSC) 311 and mobile switching centers (MSC) 312. Note that the IPSC architecture is not limited to one pair of processes per pair of platforms. If the platform can support the required network interface bandwidth and processing resources, several IPSC process pairs may run simultaneously on the same platform pair.

During the modifications to the configuration of the data communication network, as the number of BSCs increases, the amount of needed resources required by the MSC also increases. The IPSC 205 may provide the capability of carrying multiple instances of connectivity to the BSCs 201-204 on a single platform. However, the IPSC 205 may also create a focused single point of failure that can adversely and simultaneously affect all of the systems that are connected to the IPSCs that are running on that individual platform.

The IPSC 205 is fundamentally a network appliance. Each full installation of an IPSC may include two platforms that provide the necessary physical interfaces and the operating system facilities that are required to support the IPSC processes. These platforms contain a multi-threaded process that is run to perform the actual functionality of the IPSC. These two processes may communicate with each other in order to provide a single failover redundancy. The two processes together form one instance of an IPSC and each IPSC is identified by a unique ID number. The processes running are called the primary and secondary processes, and may be referenced as unit 0 and unit 1 in the related software applications and other related documentation including this disclosure.

Figure 4:
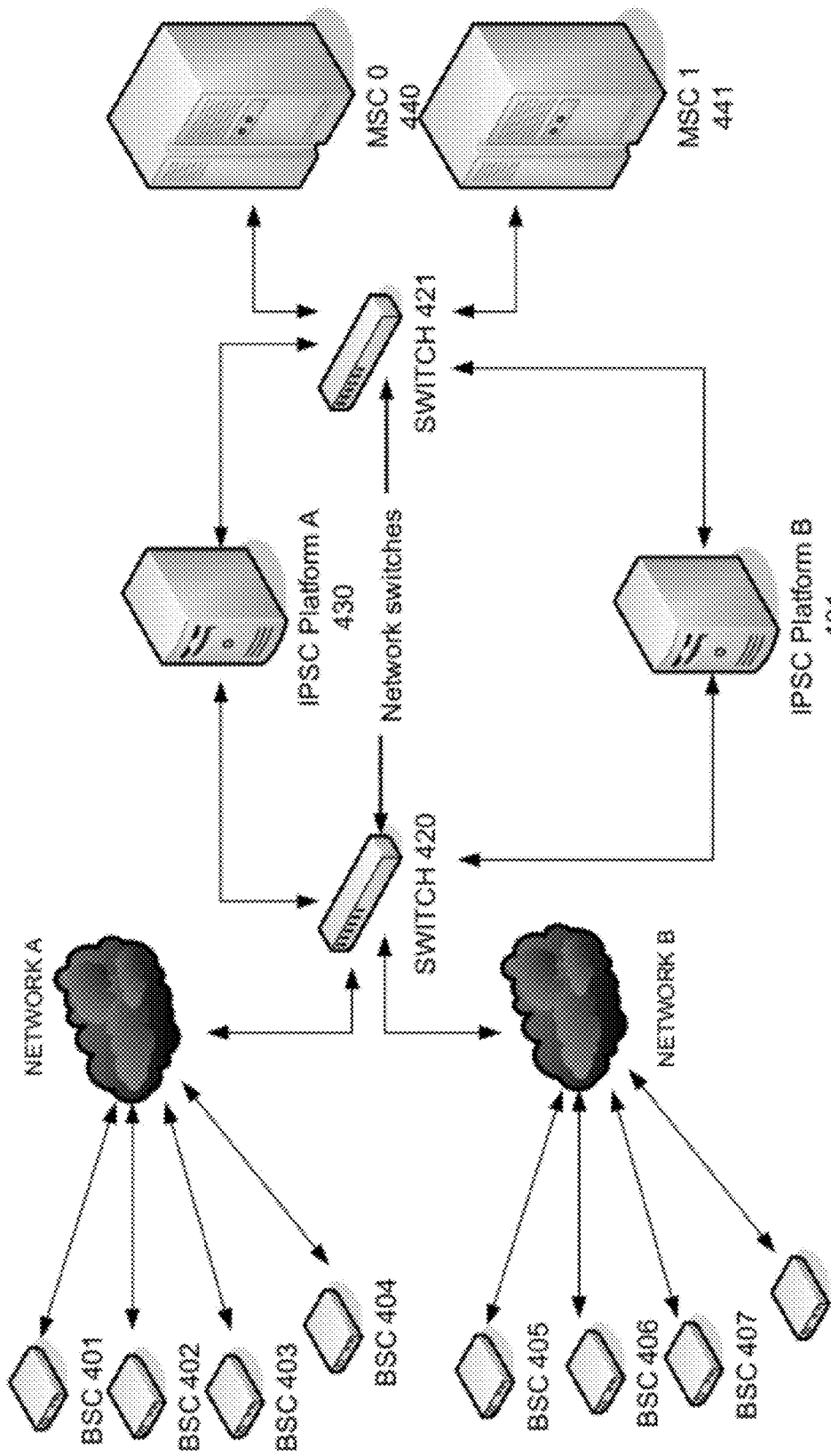
FIG. 4 illustrates a network configuration of an IPSC redundancy platform, according to example embodiments of the present invention.

FIG. 4 illustrates an example of a redundant system network configuration supporting two IPSC instances, according to example embodiments of the present invention. Redundancy in the IPSC platform may be provided by a failover system. The two processes and corresponding platforms of the IPSC may be paired into a redundant system, and may be identified as the "ACTIVE" and the "STANDBY" processes, respectively.

Referring to FIG. 4, BSCs 401-404 are operating on network A and BSCs 405-508 are operating on network B. A switch 420 connects IPSC platform A 430 and IPSC platform B 431 to the networks and respective BSCs. Another switch 421 may be used to communicate between the IPSCs 430 and 431 and the MSCs 440 and 441.

The ACTIVE system is the one that is currently connected to and communicating with the MSC and the associated set of BSCs. Upon detection of a failure, by the ACTIVE and/or the STANDBY process, the ACTIVE system will shut down and the STANDBY process will configure itself as the ACTIVE system and take over the operations. The system may not be a "fail-live" or a "fail-operational" system. A failover may be equivalent to a system reset. For example, all active calls on the associated BSCs may be disconnected, and communication with the MSC 440 and BSCs will temporarily be interrupted. The STANDBY unit may operate as a "hot spare" that will automatically become ACTIVE if the current ACTIVE unit fails. In this example, IPSC platform A 430 may be the initial ACTIVE platform, while IPSC platform B 431 may be the STANDBY platform.

The IPSC platform, in general, may allow multiple small and inexpensive BSCs to share from a pool of a limited number of ports available on previously installed, or, otherwise readily available MSCs. In order to provide readily available ports and resources, the IPSC may be inserted into the communication path between the BSCs and the MSC. The actual function of the IPSC device may appear as one large emulated BSC that is presented to the MSC, and, may also appear as a single dedicated MSC presented to each BSC. Data messages may be received and forwarded to and from the MSCs and/or the BSCs.

Referring to FIG. 4, there is no constraint on the number of IPSC instances running on a single platform pair of IPSCs 430 and 431. There is also no constraint on which of the IPSC instances is ACTIVE or is STANDBY. FIG. 4 illustrates a single platform pair. Upon this pair of IPSCs is a pair of IPSC instances for a total of four processes (IPSC instance 0 primary, IPSC instance 1 primary, IPSC instance 0 secondary and IPSC instance 1 secondary). Each IPSC instance pair is configured to connect to a specific MSC 0 440 or MSC 1 441 and service a different set of BSCs 401-404 or BSCs 405-408. In one example, the primary process may be the ACTIVE process and in another example the secondary process may be ACTIVE process.

According to one example embodiment, if the ACTIVE IPSC platform A 430 detects a communications failure with the MSC 440, it will shut itself down and reset. While this is happening, the STANDBY IPSC platform B will take over the ACTIVE role. Assuming that the failure was transient, the previously ACTIVE system will be restarted and assume the STANDBY role. If the restarted system IPSC platform A 430 cannot reach the MSC 440 or 441, it will remain offline. The same backup redundancy sequence will follow any internal error that can be detected, such as, the detection of an invalid subsystem state or other internal error whether in the hardware or the software.

In order to detect external failures in the networking hardware or the peer system of IPSCs, the two processes operating in the IPSC platforms A and B constantly communicate with each other. Each of the IPSCs 430 and 431 periodically sends to the other a message indicating the current internal state. Each IPSC expects to receive these messages in a periodic fashion. In order for this external failure detection to operate properly, the IPSCs 430 and 431 must communicate with each other over the same hardware that is used to communicate with the MSCs 440 and 441 and the BSCs 401-408. A failure in the hardware that connects to the MSC 440 or 441 will be reflected in a failure of the communications between the peer IPSCs 430 and 431. If the ACTIVE IPSC process detects both a MSC communication failure and loss of a peer on the MSC interface, it will shut itself down and let the standby IPSC unit take over the ACTIVE role.

In order to operate and properly perform the emulation of a single system while simultaneously operating two platforms, the paired IPSC processes of the IPSCs 340 and 341 may share a set of "virtual" interfaces with the outside world.

Figure 5:
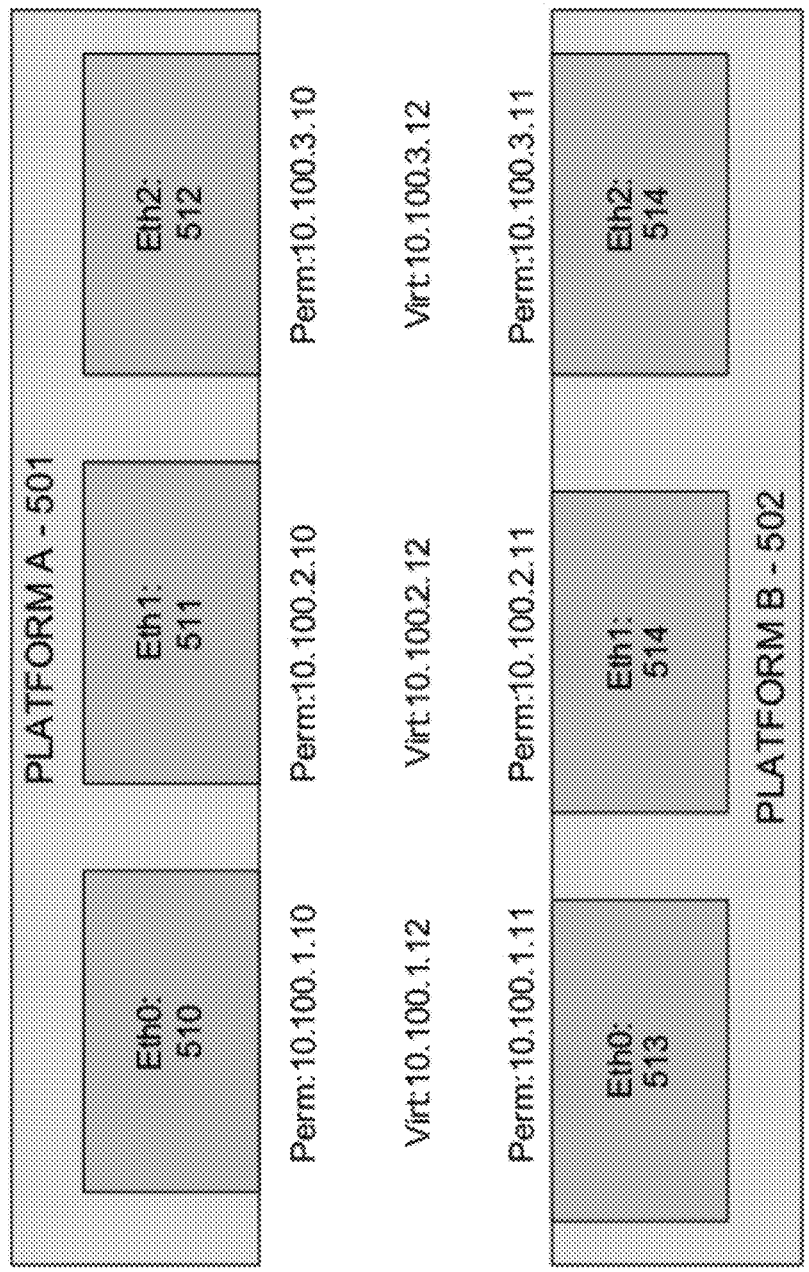
FIG. 5 illustrates an example interface configuration, according to example embodiments of the present invention.

FIG. 5 illustrates example interface platforms shared by the IPSC processes, according to example embodiments of the present invention. Referring to FIG. 5, the virtual interface designations of these interfaces should not indicate that the interfaces are virtual in the sense that they are not real interfaces. These interfaces are real physical interfaces and work just as a "normal" interface would operate. However, the virtual "virt" label represents that the interface address is portable. For example, the virtual label may be configured for either the primary IPSCs hardware or the secondary IPSCs hardware. In this respect, the address may be shared or enabled on a single IPSC unit at a given time. If an IPSC unit is the ACTIVE IPSC, it may own the virtual/shared address.

One example of an address allocation to the IPSC pair is illustrated in FIG. 5. In this illustration, the labels Eth0, Eth1, Eth2 . . . Ethx, may represent the Ethernet hardware network interfaces for platforms A and B. Platform A has permanent addresses assigned to its interfaces, such as, Eth0: 10.100.1.10, Eth1: 10.100.2.10, Eth2: 10.100.3.10. Platform B has similar addresses permanently assigned as well, such as, Eth0: 10.100.1.11, Eth1: 10.100.2.11, Eth2: 10.100.3.11. These addresses/interfaces are managed by the operating system and are not modified by the IPSC software.

These "real" or permanent addresses may be used by the IPSC processes to communicate with each other. Once it is determined which IPSC process will be the ACTIVE unit platform, it will configured by adding the virtual addresses onto its interfaces so communication may begin. The communications may be performed by using the shared addresses to communicate with the MSC and BSCs. The real addresses are not removed and the interfaces will continue to receive traffic addressed to real addresses from outside communications received or written to them from the interior communications.

Figure 6:
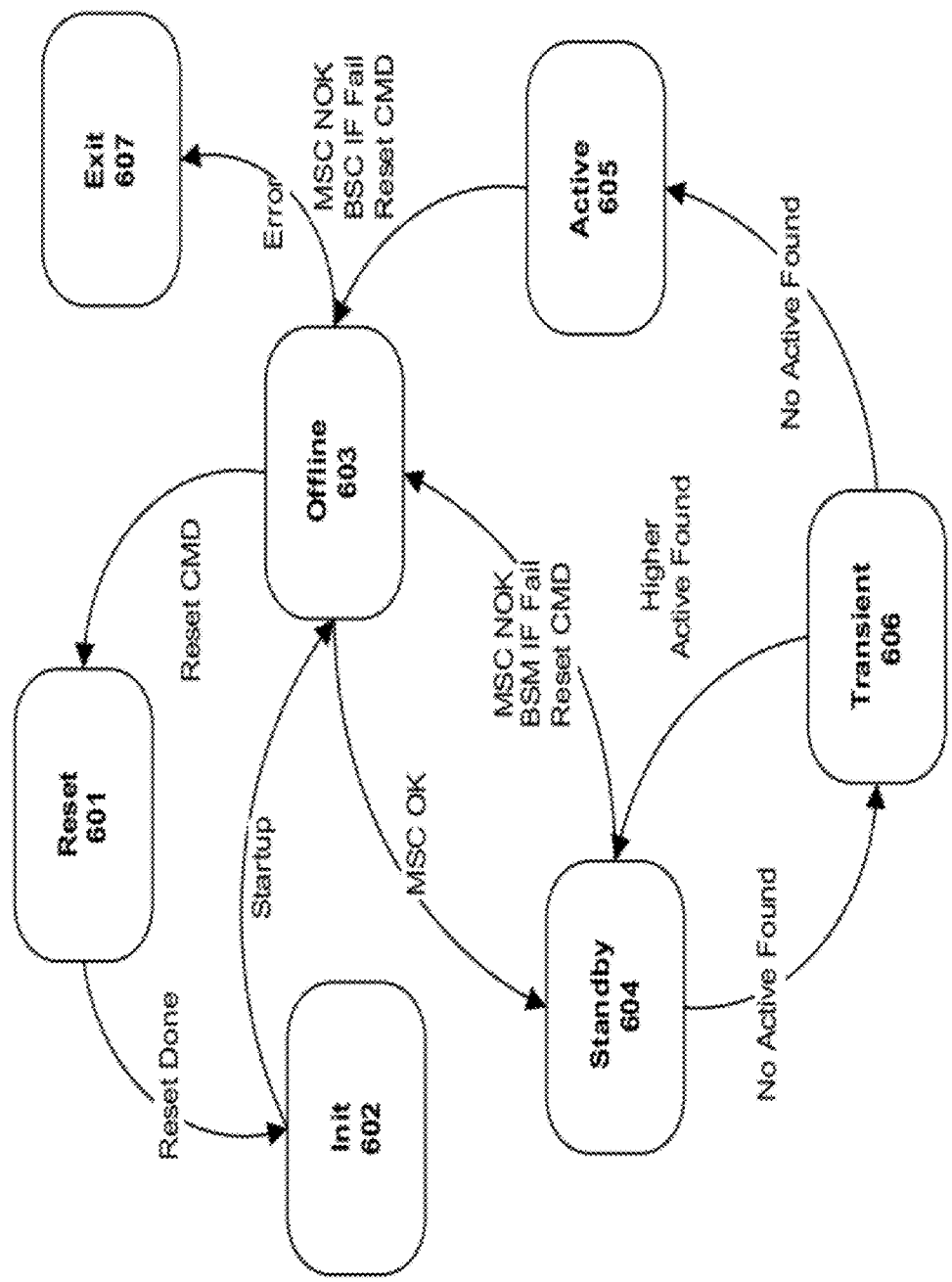
FIG. 6 illustrates an example communication state diagram, according to example embodiments of the present invention.

FIG. 6 illustrates an example state diagram of examples states of the IPSCs, according to example embodiments of the present invention. The IPSC redundancy platform may offer a single level of redundancy in a fail over or hot-spare error configuration. In order to satisfy the redundancy requirement, the redundancy platform needs to have multiple states of operation. Upon startup of the IPSC unit, it will load its configuration data, and otherwise set itself up for operation. This may be represented by the "INIT" state 602, which may also be performed after a "RESET" 601.

After completing its initialization, the IPSC will transition to the "OFFLINE" state 603. In the OFFLINE state, it will ping the neighboring BSM and/or MSC. If the IPSC does not receive timely replies it will not proceed further. If it does receive a ping reply, it will assume that is has a proper configuration and that the external network is operational. The proper initialization may cause a transition to the "STANDBY" state 604. Here, it begins monitoring its peer IPSC. If no peer is found, or no peer that is in the "ACTIVE" state 605 is found, the IPSC unit will transition to the "TRANSIENT" state 606. Here, the IPSC unit can take one of several courses of action depending on the state of its peer. For example, if no peer is found, the IPSC unit will transition to ACTIVE. If a peer is found that is ACTIVE, the IPSC unit will fall back to STANDBY, and, if a peer is found that is TRANSIENT, then the IPSC unit will compare unit ID numbers with its peer. Whichever unit is unit 0 will proceed to ACTIVE, and unit 1 will fall back to STANDBY. If a peer is found that is not ACTIVE or TRANSIENT, then the IPSC unit will proceed to the ACTIVE state. In all states STANDBY, TRANSIENT, and ACTIVE, the IPSC unit continues listening for and transmitting to its peer and continually maintaining its own internal status and the external state of its peer.

The operation of a standalone, non-redundant IPSC unit is essentially the same as that of a redundant IPSC unit that has had its peer fail. For example, if one of the IPSC units is designated as unit "0" among a pair of IPSC units, and its peer is not ACTIVE, then unit "0" will naturally assume the ACTIVE state. If the IPSC unit is designated unit "1", and its peer is not ACTIVE or TRANSIENT, then it will assume the ACTIVE state. The EXIT state 607 can be reached directly from any of the other states if an internal error is detected or if the process is killed by the operating system due to a fault.

Below are some example communication statuses related to the operation of the IPSCs. "MSC OK" may represent that the MSC is reachable via a ping operation. "No Active Found" may represent that the IPSC process has not received an ACTIVE packet from a peer in three sampling cycles, "Higher Active Found" may represent that the IPSC process has received an ACTIVE packet with higher priority from a peer. "BSM IF" may represent the loss of (ping) contact with the BSM, or loss of contact (SCTP connection) with ALL BSCs, after contact with at least one BSC has been established. "MSC NOK" may represent the loss of contact with the MSC either through ping failure (while OFFLINE or STANDBY) or loss of SCTP association while ACTIVE. "MSC IF Failure" may represent that failure detection is not required for a state transition, but can be determined from loss of contact with the MSC and with the peer over the MSC interface while contact with the peer remains OK over the BSC side. "BSM IF Failure" may represent that the loss of contact with the BSM will not cause a state transition. Failure of the remote network or BSM can be separated from failure of the local network or BSM interface by checking against the other peer contact states.

Figure 7:
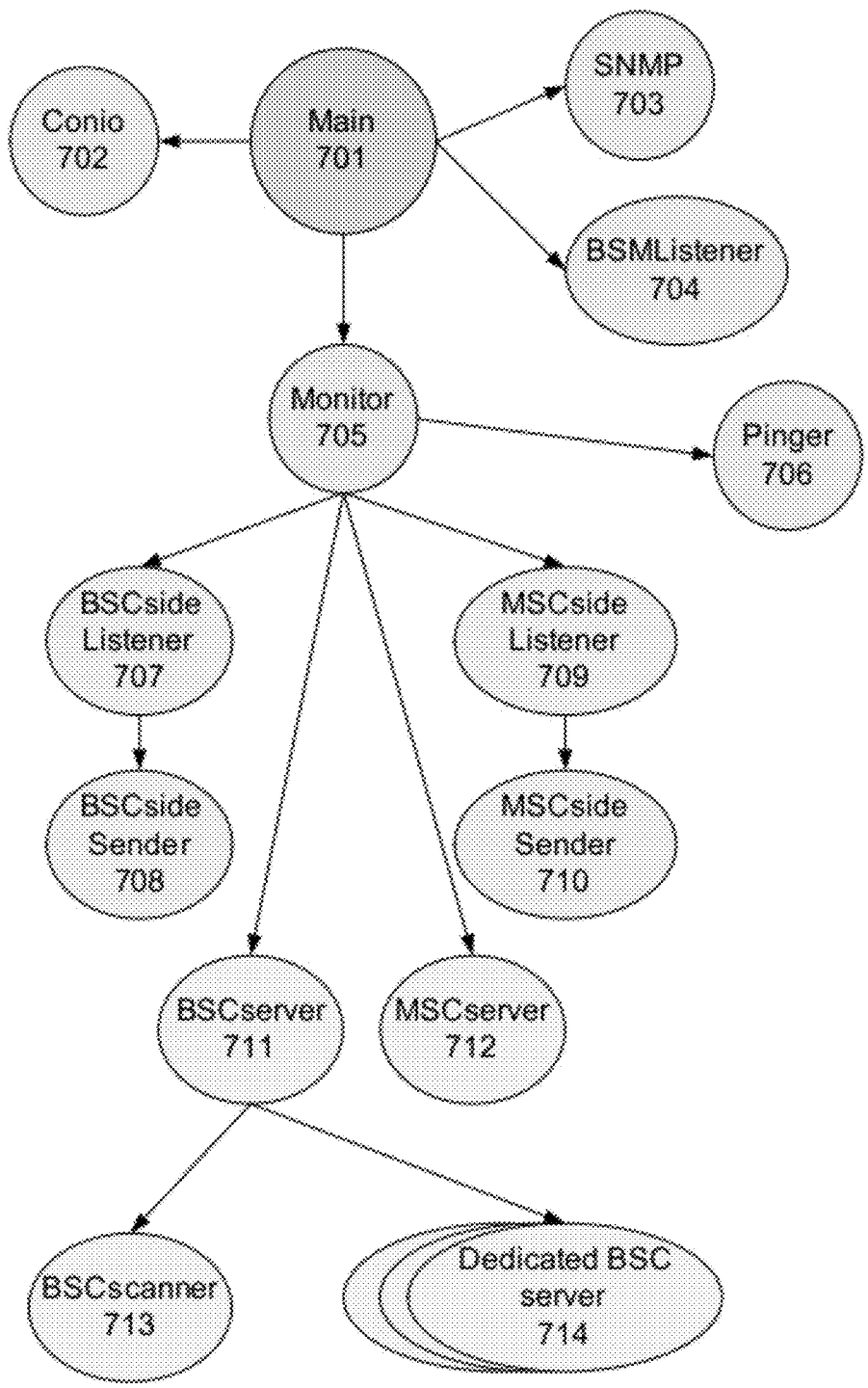
FIG. 7 illustrates an internal software architecture of threads operating in according with example embodiments of the present invention.

FIG. 7 illustrates an internal software architecture, according to example embodiments of the present invention. Referring to FIG. 7, a main thread 701 is illustrated which initializes and starts all other threads. This thread process may begin at process start or the main operation thread 701. Conio 702 is the utility console I/O menu thread. Conio 702 may be started by the main thread after entering the OFFLINE state, and may be active in all states except INIT and RESET. Its purpose is to provide console utility functions for debugging, log control, etc.

Figure 8:
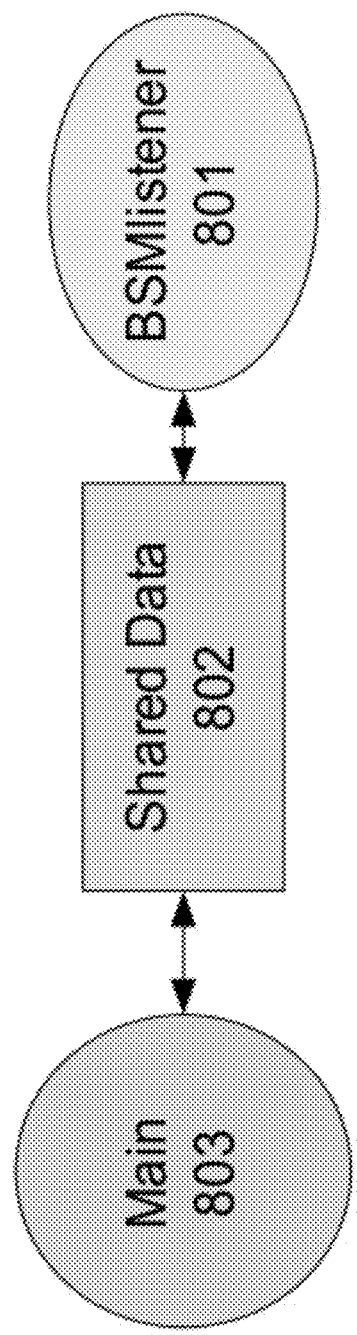
FIG. 8 illustrates an example flow diagram, according to example embodiments of the present invention.

The BSMlistener 704 operation/thread is a simple loop operation, started by main 701 upon entering the OFFLINE state, and may be run in all states except for INIT and RESET. This operation opens a UDP port and then listens for RESET/RELOAD commands from the BSM. Upon reception of the commands, it performs the reload and forwards the need, or lack thereof, for a reset back to the main thread 701. FIG. 8 illustrates a flow diagram for the BSMlistener operation 801. The simple loop of the BSMlistener 801 operates with an initialization of the main operation 803. The BSMlistener listens for the RESET/RELOAD commands and shares the data 802 with the main operation 803.

The SNMP 703 is started by main operation 701 upon entering the OFFLINE state, it is an SNMP daemon that responds to SNMP queries for status. It runs in all states except for INIT and RESET. Monitor operation 705 is started by main operation 701 when entering the OFFLINE state, this thread runs in all states except for INIT and RESET. This operation starts and stops the various peer and endpoint monitoring threads and is responsible for making OFFLINE/STANDBY/TRANSIENT/ACTIVE transitions and configuring interfaces.

Figure 9:
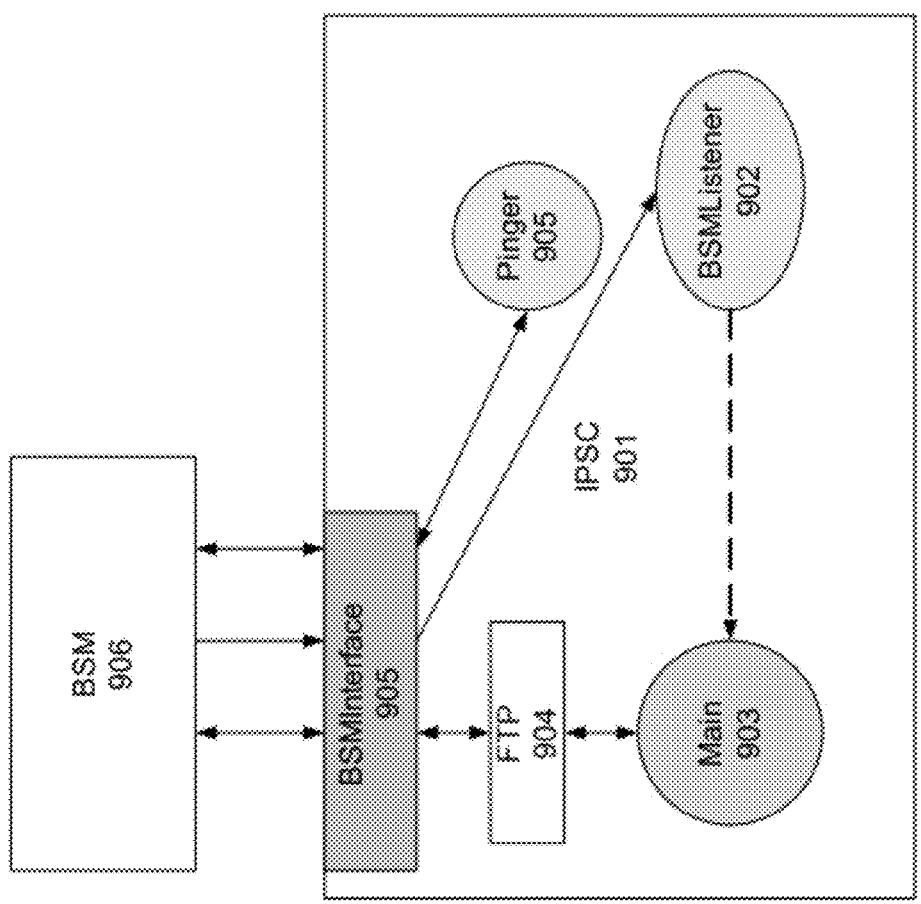
FIG. 9 illustrates an example network configuration of an IPSC and BSM, according to example embodiments of the present invention.

The pinger operation 706 is a simple loop, it constantly pings the BSM and MSC to determine availability. The pinger 706 is started by "Monitor" 705 upon entering the OFFLINE state and runs in all operational states except for INIT and RESET. FIG. 9 illustrates an example system diagram of the flow of information for the pinger operation 706. Referring to FIG. 9, the BSM 906 is constantly pinged from the IPSC 901 via the BSMinterface 905. The pinger operation 905 communicates with the BSMinterface 905 and the main operation 903. An FTP 904 protocol may be used to communicate with the BSMinterface 905.

The BSCsideSender operation 708 is started by "Monitor" 705 on entry to the STANDBY state, this thread runs in STANDBY, TRANSIENT, and ACTIVE states. It is a simple timed loop, which transmits system state messages to its peer IPSC BSC side listener thread over the BSC side interfaces. This operation is performed by the active IPSC unit 1049 and the standby IPSC unit 1059 of FIG. 10A. Both units communicate with the BSC 1030 via BSCinterfaces 1040 and 1050. The BSC 1030 may communicate via a SCTP interface 1031.

Figure 10A:
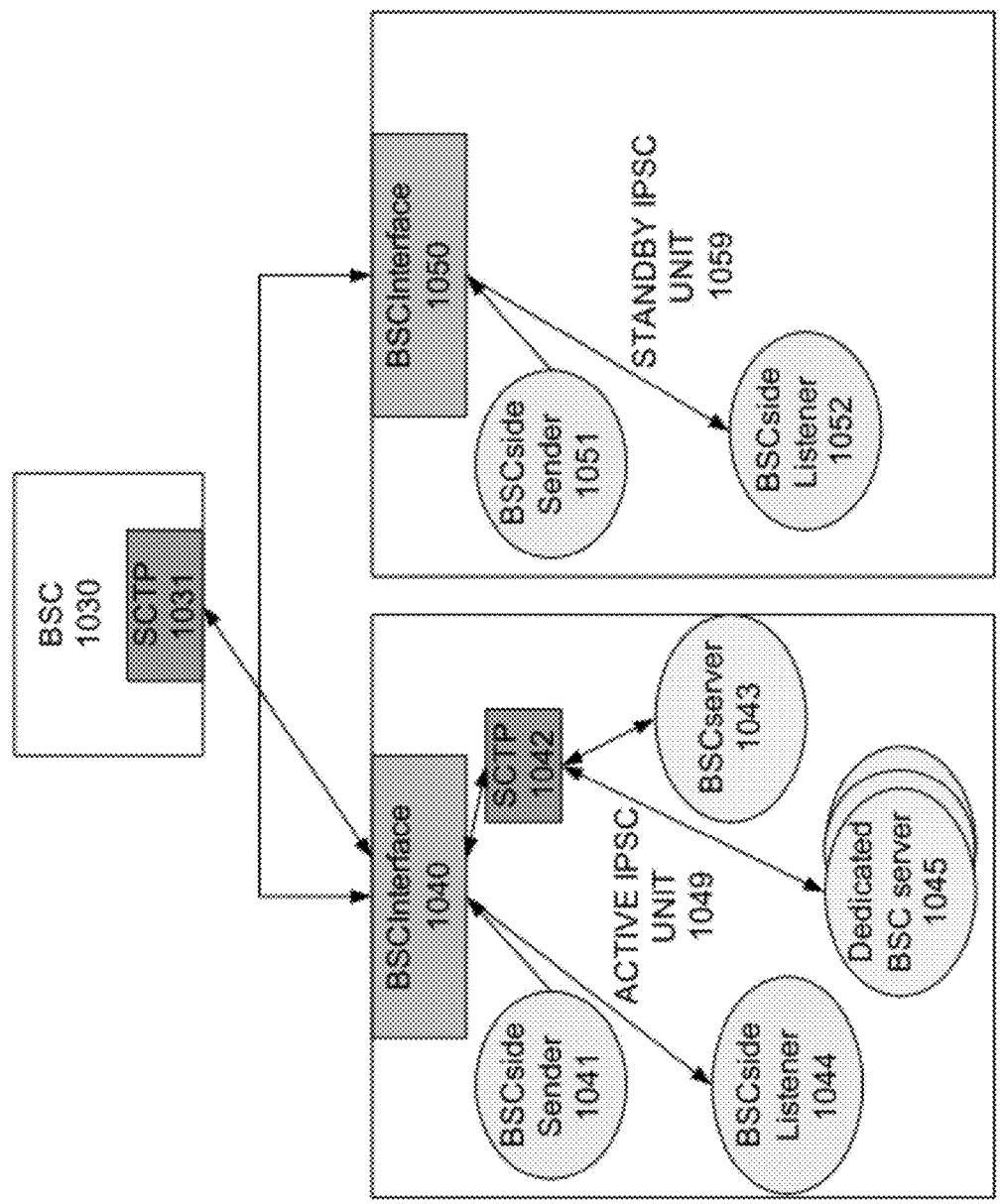
FIG. 10A illustrates an example network configuration of a IPSC redundancy model interfacing with a BSC, according to example embodiments of the present invention.

The BSCsideListener 707 is started by the "Monitor" operation when entering the STANDBY state, this thread runs in the STANDBY, TRANSIENT, and ACTIVE states. It is a simple loop, which receives messages from the peer sender over the BSC interface. It also tracks how long it has been since it received a message, and if it has been too long a time period, it announces the change of state. It will also continue to listen, and, if contact with the peer is restored, it will change its state accordingly. FIG. 10A also illustrates the BSCsidelistener operations 1052 and 1044 as operations processed by the active and standby IPSCs 1049 and 1059.

The BSCserver 711 is an operation that is started by "Monitor" 705, and only runs on the ACTIVE process. It sets up an SCTP socket on the shared BSC address/interface to receive incoming connections from the associated BSCs. BSCserver 711 also performs listening on the socket for incoming (new) connections from BSCs, and performs handoffs of the new SCTP socket to a dedicated "BSCthread." The BSCserver 1043 of FIG. 10A may only be part of the active IPSC unit 1049 and not the standby IPSC unit 1059.

The dedicated BSCthread(s) may be initiated by "BSCserver" operation 711, these dedicated threads may only run on the ACTIVE process. There is one dedicated thread for each connected BSC. This thread maintains the SCTP connection to the specific BSC, receives packets from the BSC, hands them off to the L3 code for processing, and then forwards them to the MSC. The dedicated BSCserver thread 1045 may also be part of the active IPSC unit 1049 and not the standby IPSC unit 1059.

The BSCscanner operation 713 is a thread that is started by the "BSCserver" operation 711 after at least one BSC association has been accepted. This thread runs only on the ACTIVE process. It scans the BSC state table for new connections and disconnections and sends state changes via a SNMP trap to the BSM. If ALL BSC connections are lost, it alerts the "Monitor" thread of the likely BSC interface or network failure.

Figure 10B:
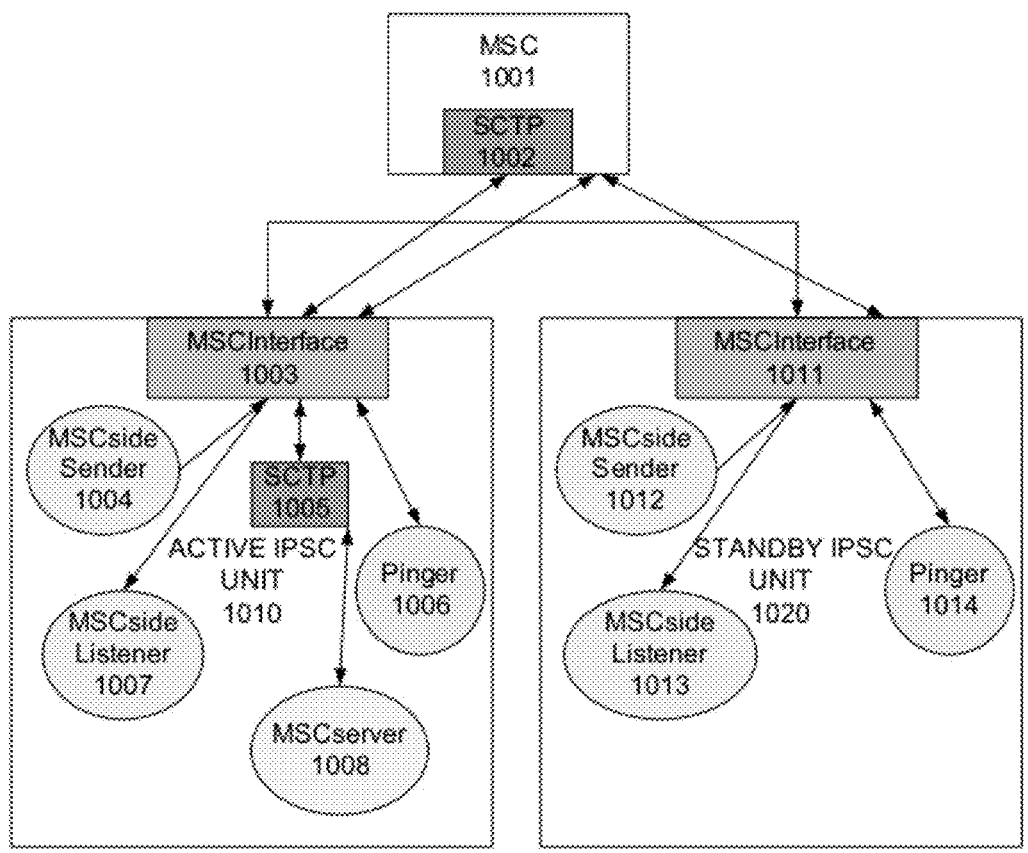
FIG. 10B illustrates another example network configuration of a IPSC redundancy model interfacing with a MSC, according to example embodiments of the present invention.

FIG. 10B illustrates the operations, threads and communication interfaces included in the IPSCs with respect to the MSC communications. Referring to FIG. 10B, The MSC 1001 communicates through a SCTP interface 1002 with the MSC interfaces 1003 and 1011 of the IPSC units 1010 and 1020. Both IPSC units include a MSCsidesender application 1004 and 1012, pinger operations 1006 and 1014 and MSCsidelistener applications 1007 and 1013. The active IPSC 1010 includes a MSCserver 1008, which is not included in the standby IPSC unit 1020.

The MSCsideSender operation 710 is a thread that transmits messages to its peer MSC side listener thread 709 over the MSC interface. This thread is started by the "Monitor" thread upon entering the STANDBY state and runs in the STANDBY, TRANSIENT, and ACTIVE states. The MSCsideListener thread 709 is a thread that receives messages from its peer sender except over the MSC interface. This thread is started by the "Monitor" thread upon entering the STANDBY state and runs in the STANDBY, TRANSIENT, and ACTIVE states.

The MSCserverthread 712 is started by the "Monitor" thread on entry to the ACTIVE state. This thread establishes and services the SCTP association with MSC. It receives packets from the MSC, hands them off to the L3 code for processing and then forwards the data to the desired BSC(s) over their dedicated SCTP sockets. The MSCserverthread 712 and 1008 may only operate in the active IPSC unit 1010.

Figure 11:
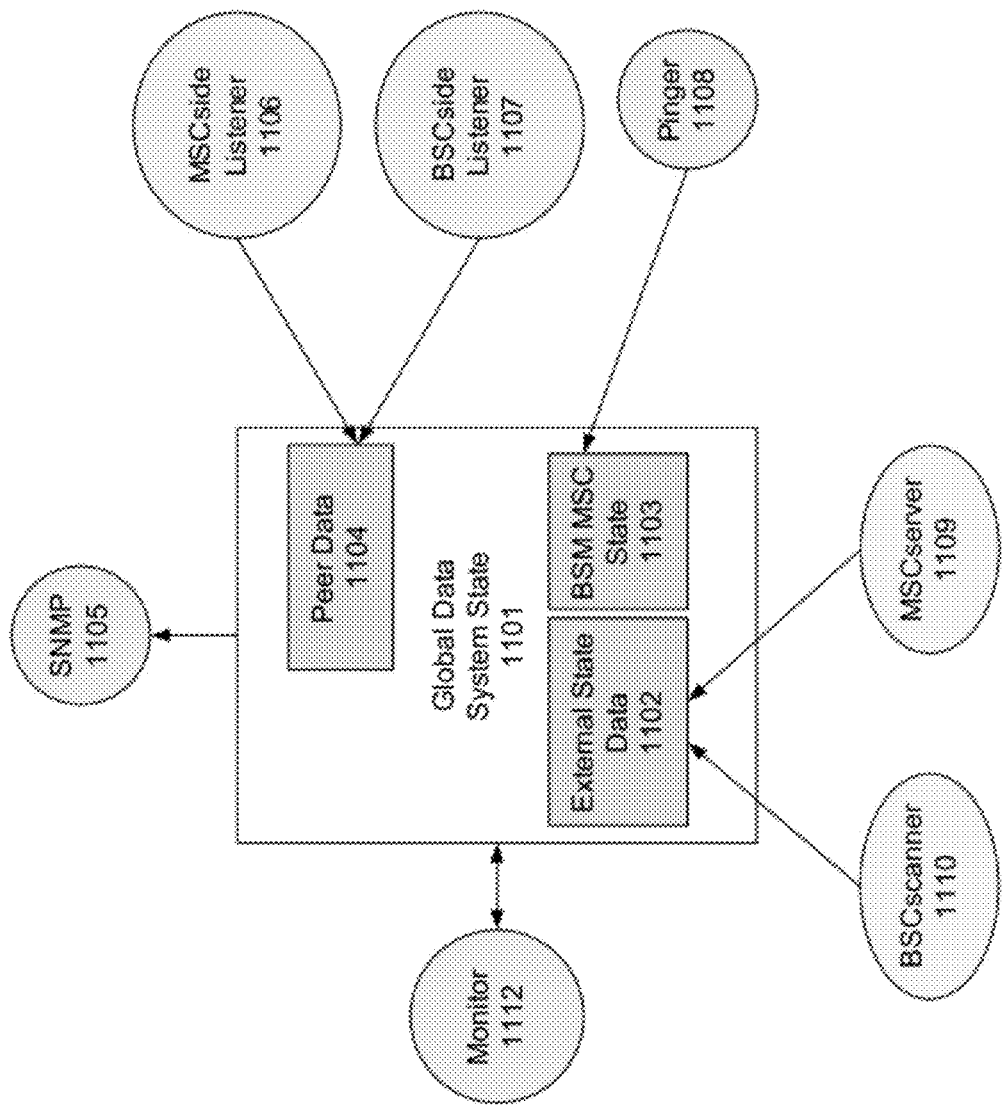
FIG. 11 illustrates an example network configuration of a global data system state, according to example embodiments of the present invention.

FIG. 11 illustrates a global data system state operation flow diagram, according to example embodiments of the present invention. The global data system state 1101 includes records that contain all of the state information, which may be transmitted to its peer over the various interfaces, such as, peer data interface 1101, external state data interface 1102 and BSM MSC state interface 1103. All state values are contained in simple integer variables. Access is protected by a read/write locking mutex mechanism. Some threads will write specific variables while others will only read variables. For example, except during reset or initialization, the "Pinger" 1108 is the only thread that will write to (maintain) the BSM state variable. The "Monitor" thread will read it and use it to decide if the IPSC process can transition from offline to STANDBY.

Peer data interface 1104 may receive data from the MSC-sidelistener operation 1106 and the BSCsidelistener operation 1107. Such data may include the state changes of the peer devices. The external state data interface 1102 may receive data from the BSCscanner operation 1110 and the MSCserver operation 1109. SNMP 1105 may be used to transmit messages to and from the global data system state 1101. The monitor application 1112 may initialize or reset the operations of the global data system state 1101.

Below are some examples of operational state metrics, according to example embodiments of the present invention. For example, one state metric may be "Priority": rank in group, set by unit number. The lower the unit number, the higher the priority. If both of the IPSC processes that form a peer group transition from STANDBY to TRANSIENT on the same state evaluation cycle, then on the next cycle the process with the lower unit number/higher priority will transition to ACTIVE and the process with the higher unit number/lower priority will drop back to STANDBY.

Other example state metrics may include "BSM state Alive": NA, TRUE, FALSE. This state metric utilizes the current results from the "Pinger", or will show NA if the "Pinger" is not running yet." Another state metric may include "BSC stateAlive": NA, TRUE, FALSE. For this state metric, if the current system state is not ACTIVE, then the BSC state=NA. If the current state is ACTIVE, it will start with NA, then after a BSC connects, it will change its status to TRUE. If after at least one BSC has connected, then thereafter if all are disconnected, then the state changes to FALSE.

Another state metric may include "BSC peer state": NA, STANDBY, TRANSIENT, ACTIVE. This state reflects a subset of the main states. If BSCpeer==STANDBY, then the state should be STANDBY, TRANSIENT, or ACTIVE. If BSCpeer==NA then our state should be OFFLINE, STANDBY, TRANSIENT, or ACTIVE. Another state metric may include MSC stateAlive: NA, TRUE, FALSE. This state reflects the current results from the "Pinger". Another state may include MSCSCTP: OK, NOK. OK means that the SCTP connection to the MSC is up. If the state is !=ACTIVE, this must be not ok or NOK. Another state may be the MSC peer state: NA, STANDBY, TRANSIENT, ACTIVE (similar to BSC peer state). If the MSCpeer==STANDBY, then our state should be TRANSIENT or ACTIVE. If the MSCpeer==NA then our state should be OFFLINE, STANDBY, TRANSIENT, or ACTIVE.

Examples of process flows for operational states are described in detail below. For example, the OFFLINE state may provide that the "BSMlistener" operation idles and waits for commands from the BSM. This behavior is the same for all states where this thread is active. The SNMP thread waits for and serves any queries. This behavior is the same for all states where this thread is active. The main thread waits for commands forwarded from the "BSMlistener." If at any time a RESET is received, then the main thread will start to shutdown all of its child threads. Each child is responsible for the orderly shutdown of its own child threads. This behavior may be the same for all states except INIT.

One example operational flow for the monitor state may include the "Monitor" starting the "Pinger" thread and then waiting for data from it. If the "Pinger" returns "alive" values for both the MSC and BSM, the "Monitor" will assume that the IPSC process is operating with a sane configuration and cause the state to transition to STANDBY. One example operational flow for the pinger operation may include the "Pinger" periodically pinging the BSM and MSC and reporting the results. This behavior is the same for all states where this thread is active.

Example operational flows for the STANDBY State are described in detail below. For example, the "Monitor" thread may start the senders and listeners on the BSC and MSC interfaces. Based on the data reported by the listeners, the "Monitor" thread will select to remain in STANDBY, transition to OFFLINE, or transition to TRANSIENT. Possible scenarios are described in detail below. For example, both the BSC and the MSC listeners report a peer found that is not ACTIVE, the "Monitor" will transition to TRANSIENT. Both of the BSC and MSC report a peer found that is TRANSIENT, then the "Monitor" will remain in STANDBY. If the "Monitor" finds the peer ACTIVE, the "Monitor" will remain in STANDBY. If the BSC and MSC report different results for the existence and state of the peer, then the "Monitor" will stop the senders and listeners on both sides and transition to OFFLINE.

Example operational flows for the TRANSIENT state are described in detail below. This state can only last one evaluation cycle. Possible scenarios are outlined below. For example, if the BSC and MSC listeners report a peer that is not TRANSIENT or ACTIVE, then the "Monitor" operation will transition to ACTIVE. If the listeners report a peer that is TRANSIENT, then the "Monitor" operation will compare the unit number/priority values, and if the "Monitor" operation has a higher unit number than the peer, then the "Monitor" operation will transition to STANDBY. If the priority of the local process is higher than the peer, then the "Monitor" operation will transition to ACTIVE.

Example operational flows for the ACTIVE state are described in detail below. The "Monitor" will bring up the virtual/shared addresses on the BSC and MSC interfaces and then start the "MSCserver." If an SCTP association is established, the "Monitor" will start the "BSCserver." If the SCTP association fails, the "Monitor" will stop the "MSCserver" and "BSCserver", stop the senders and listeners on both sides, and transition to the OFFLINE state. If the SCTP connection to the MSC is established and then later is lost, the "Monitor" will again stop the "MSCserver" and "BSCserver", stop the senders and listeners on both sides, and transition to the OFFLINE state. If the BSC scanner reports that ALL BSC connections have been lost, then as above, the "Monitor" will shut down the threads and transition to the OFFLINE state.

The "MSCserver" will wait for data from the MSC and if it receives a packet, it will be forwarded to the L3 code. The "BSCserver" will wait for incoming connections from the client BSCs. Upon establishment of an SCTP association, the "BSCserver" will fork a dedicated service thread and hand off the SCTP socket to that thread for further operations. After starting the first dedicated BSC server, the "BSCserver" will start the BSC scanner which will monitor the BSC state table. Additionally, dedicated BSCserver threads (if any) will accept data from the associated BSC, and forward it to the L3 code for further processing. If the SCTP socket fails, or is closed from the far end, the dedicated server will shut down. Also, the BSC scanner thread scans the BSC state table for new connections or disconnects and reports them via SNMP traps sent to the BSM. If all connections to the BSCs are lost, it will report this data to the "Monitor" thread.

Example operational flows for the RESET state and RELOAD state are described in detail below. The RESET command causes an almost complete system shutdown and restart. This might be modified to produce a true shutdown and let the platform OS restart the process. The RELOAD command will download a new configuration file from the BSM and implement the changes. Note that certain changes will cause a reset as outlined below. Changes to the MSC IP address or any of its parameters will cause a reset. Changes to the BSM IP address will cause a reset and another reload. Changes to BSC parameters will only cause that BSC (if it has an existing configuration entry) to be disconnected and the internal memory cleared.

According to another example operation, a Reset+Reload combination operation may be performed. A simple combination of the reset and reload commands may force a download of a new configuration file without regard for the local configuration file setting and a reset will occur.

Example operational flows for the SNMP protocol are described in detail below. An SNMP daemon runs and reports the IPSC state. Traps are sent to the BSM server whenever the IPSC or its peer changes state. Data is reported over SNMP from each member of the pair and not just the ACTIVE unit. Examples of reported data may include the trap ACTIVE/STANDBY/TRANSIENT/OFFLINE state, the peer ACTIVE/STANDBY/TRANSIENT/OFFLINE state, and the trap BSC individual State SCTP OK/NOK.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 13 illustrates an example network element 1300, which may represent any of the above-described network components 101-104, 201-206, 301, 310-312, 401-408, 420, 421, 430, 431, 440, 441, 501, 502, 901, 906, 1049, 1059, 1030, 1001, 1010 and 1020.

Figure 13:
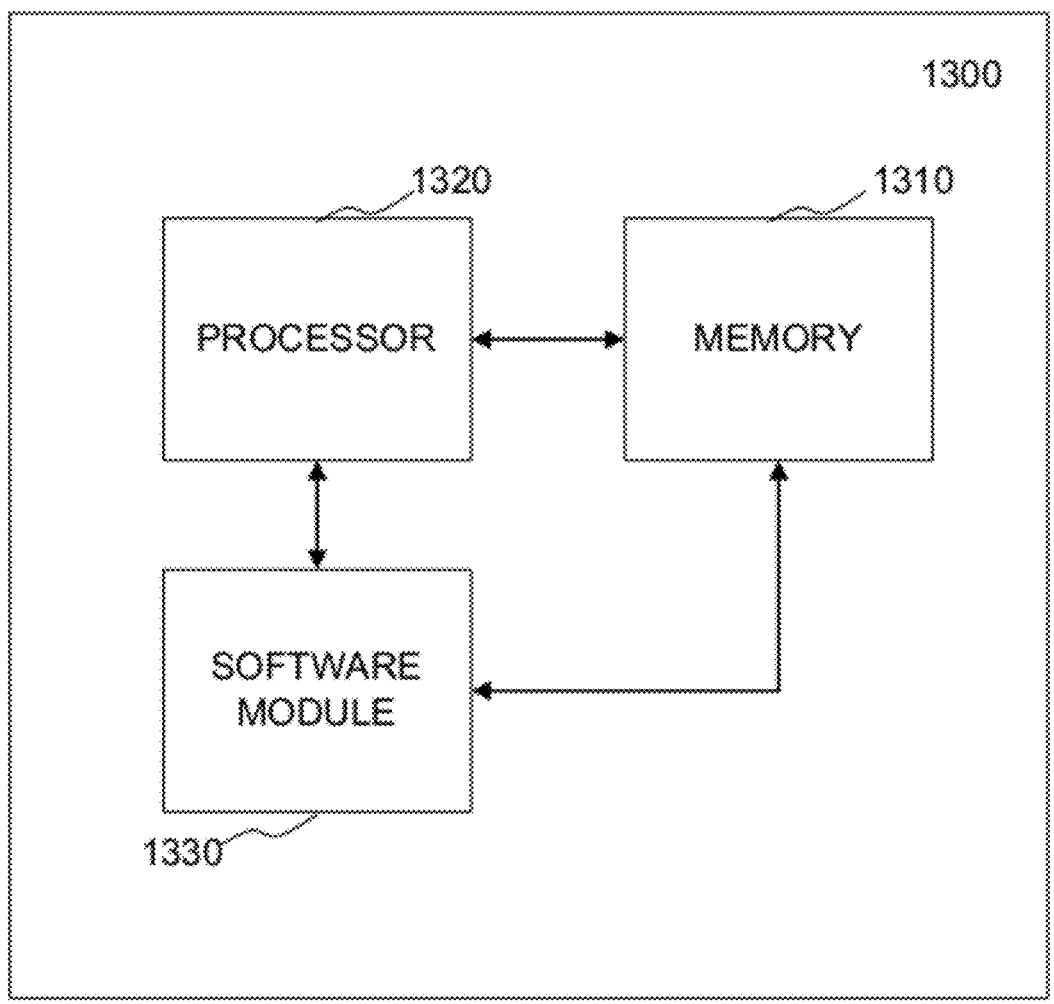
FIG. 13 illustrates an example network entity, receiver and/or transmitter configured to store software instructions and perform example operations disclosed throughout the specification.

As illustrated in FIG. 13, a memory 1310 and a processor 1320 may be discrete components of the network entity 1300 that are used to execute an application or set of operations. The application may be coded in software in a computer language understood by the processor 1320, and stored in a computer readable medium, such as, the memory 1310. The computer readable medium may be a non-transitory computer readable medium that includes tangible hardware components in addition to software stored in memory. Furthermore, a software module 1330 may be another discrete entity that is part of the network entity 1300, and which contains software instructions that may be executed by the processor 1320. In addition to the above noted components of the network entity 1300, the network entity 1300 may also have a transmitter and receiver pair configured to receive and transmit communication signals (not shown).

Figure 12:
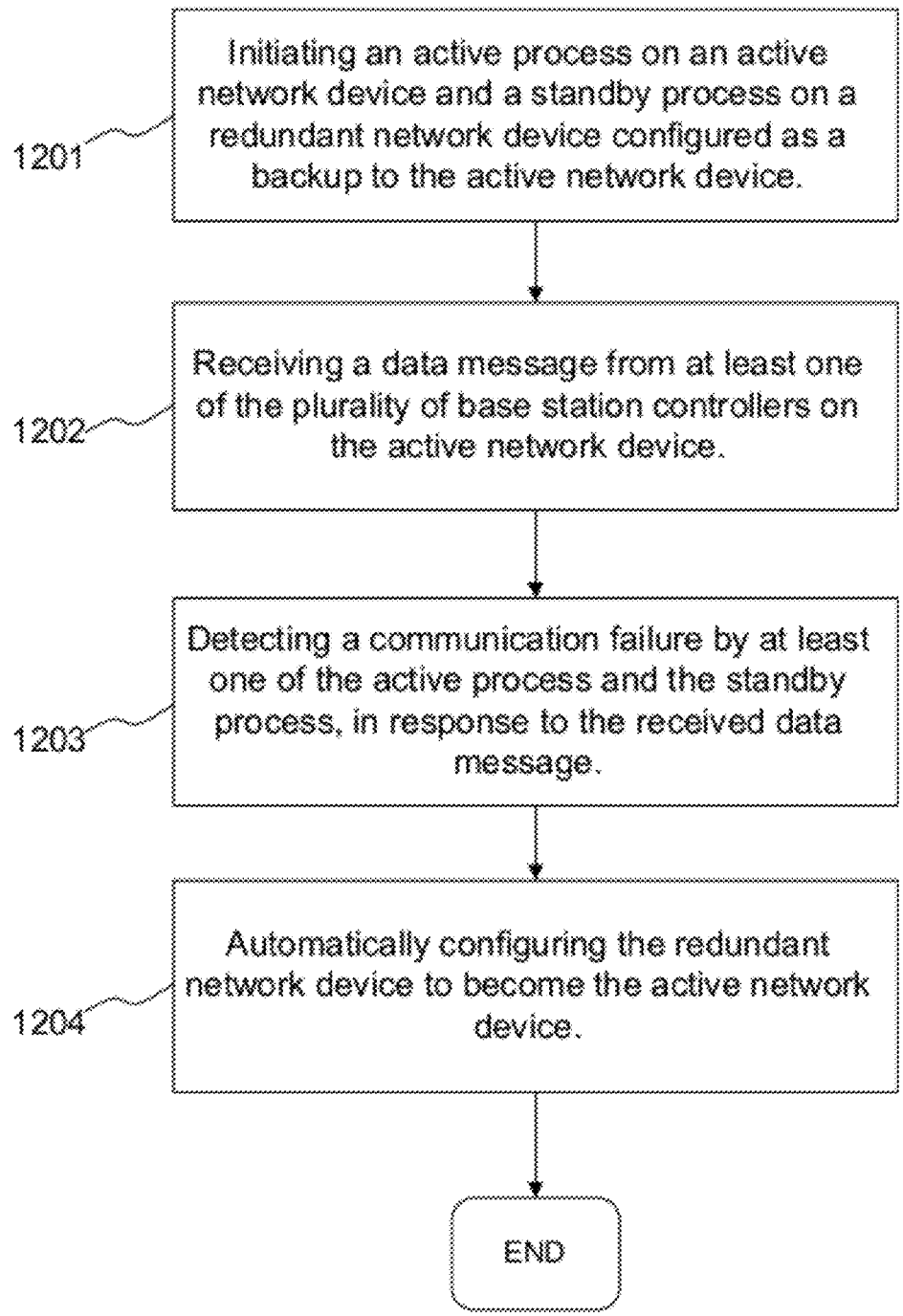
FIG. 12 illustrates an example flow diagram of a method according to example embodiments of the present invention.

One example method of the present invention may include communicating between a plurality of base station controllers and at least one mobile switching center, as illustrated in the flow diagram of FIG. 12. The method may include initiating an active process on an active network device and a standby process on a redundant network device configured as a backup to the active network device, at operation 1201. The method may also include receiving a data message from at least one of the plurality of base station controllers on the active network device, at operation 1202. The method may also include detecting a communication failure by at least one of the active process and the standby process, in response to the received data message, at operation 1203, and automatically configuring the redundant network device to become the active network device, at operation 1204.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of communicating between a plurality of base station controllers and at least one mobile switching center, the method comprising:
   initiating an active process on an active Internet Protocol Signaling Concentrator (IPSC) and a standby process on a redundant (IPSC) configured as a backup to the active (IPSC), the active (IPSC) and the redundant (IPSC) intermediate the plurality of base station controllers and the at least one mobile switching center;
   receiving a data message from at least one of the plurality of base station controllers on the active (IPSC);
   detecting a communication failure by at least one of the active process and the standby process, in response to the received data message; and
   automatically configuring the redundant (IPSC) to become the active (IPSC).

2. The method of claim 1, wherein the data message is destined for the at least one mobile switching center.

3. The method of claim 1, further comprising: allocating a port on the active (IPSC) for the at least one base station controller that transmitted the data message and forwarding the data message from the active (IPSC) to the at least one mobile switching center.

4. The method of claim 1, further comprising:
   determining that the failure occurred while being processed by the active process.

5. The method of claim 1, further comprising:
   disconnecting all active calls being processed by the plurality of base station controllers as a result of the communication failure being detected.

6. The method of claim 1, wherein the communication failure is detected by the active (IPSC), and wherein the communication failure is determined to be a lack of communication with the at least one mobile switching center.

7. The method of claim 1, further comprising:
   upon detection of the communication failure, shutting down the active (IPSC) and restarting the active (IPSC), and during the shutting down and restarting operations, the redundant (IPSC) takes over the role as the new active (IPSC) and the active (IPSC) takes over the role as the new redundant (IPSC).

8. An apparatus configured as an Internet Protocol Signaling Concentrator (IPSC) to communicate between a plurality of base station controllers and at least one mobile switching center, the apparatus comprising:
   a processor configured to initiate an active process on the apparatus and a standby process on a redundant (IPSC) configured as a backup to the apparatus, the apparatus and the redundant (IPSC) intermediate the plurality of base station controllers and the at least one mobile switching center; and a receiver configured to receive a data message from at least one of the plurality of base station controllers, wherein the processor is further configured to detect a communication failure by at least one of the active process and the standby process, in response to the received data message, and automatically configure the redundant (IPSC) to become an active (IPSC).

9. The apparatus of claim 8, wherein the data message is destined for the at least one mobile switching center.

10. The apparatus of claim 8, wherein the processor is further configured to allocate a port on the apparatus for the at least one base station controller that transmitted the data message, and further comprising a transmitter that is configured to forward the data message to the at least one mobile switching center.

11. The apparatus of claim 8, wherein the processor is further configured to determine that the failure occurred while being processed by the active process.

12. The apparatus of claim 8, wherein the processor is further configured to disconnect all active calls being handled from the plurality of base station controllers as a result of the communication failure being detected.

13. The apparatus of claim 8, wherein the communication failure is detected by the apparatus, and wherein the communication failure is determined to be a lack of communication with the at least one mobile switching center.

14. The apparatus of claim 8, wherein upon detection of the communication failure, the processor is further configured to shut down the apparatus and restart the apparatus, and during the shutting down and restarting operations, the redundant (IPSC) takes over the role as the new active (IPSC) and the apparatus takes over the role as the new redundant (IPSC).

15. A non-transitory computer readable storage medium configured to store instructions that when executed by a processor cause the processor to perform communications between a plurality of base station controllers and at least one mobile switching center, the processor being further configured to perform:

initiating an active process on an active Internet Protocol Signaling Concentrator (IPSC) and a standby process on a redundant (IPSC) configured as a backup to the active (IPSC), the apparatus and the redundant (IPSC) intermediate the plurality of base station controllers and the at least one mobile switching center;

receiving a data message from at least one of the plurality of base station controllers on the active (IPSC);

detecting a communication failure by at least one of the active process and the standby process, in response to the received data message; and automatically configuring the redundant (IPSC) to become the active (IPSC).

16. The non-transitory computer readable storage medium of claim 15, wherein the data message is destined for the at least one mobile switching center.

17. The non-transitory computer readable storage medium of claim 15, further comprising:

allocating a port on the active (IPSC) for the at least one base station controller that transmitted the data message and forwarding the data message from the active (IPSC) to the at least one mobile switching center.

18. The non-transitory computer readable storage medium of claim 15, further comprising:

determining that the failure occurred while being processed by the active process.

19. The non-transitory computer readable storage medium of claim 15, further comprising:

disconnecting all active calls being processed by the plurality of base station controllers as a result of the communication failure being detected.

20. The non-transitory computer readable storage medium of claim 15, wherein the communication failure is detected by the active (IPSC), and wherein the communication failure is determined to be a lack of communication with the at least one mobile switching center.

* * * * *